Patented Aug. 21, 1934

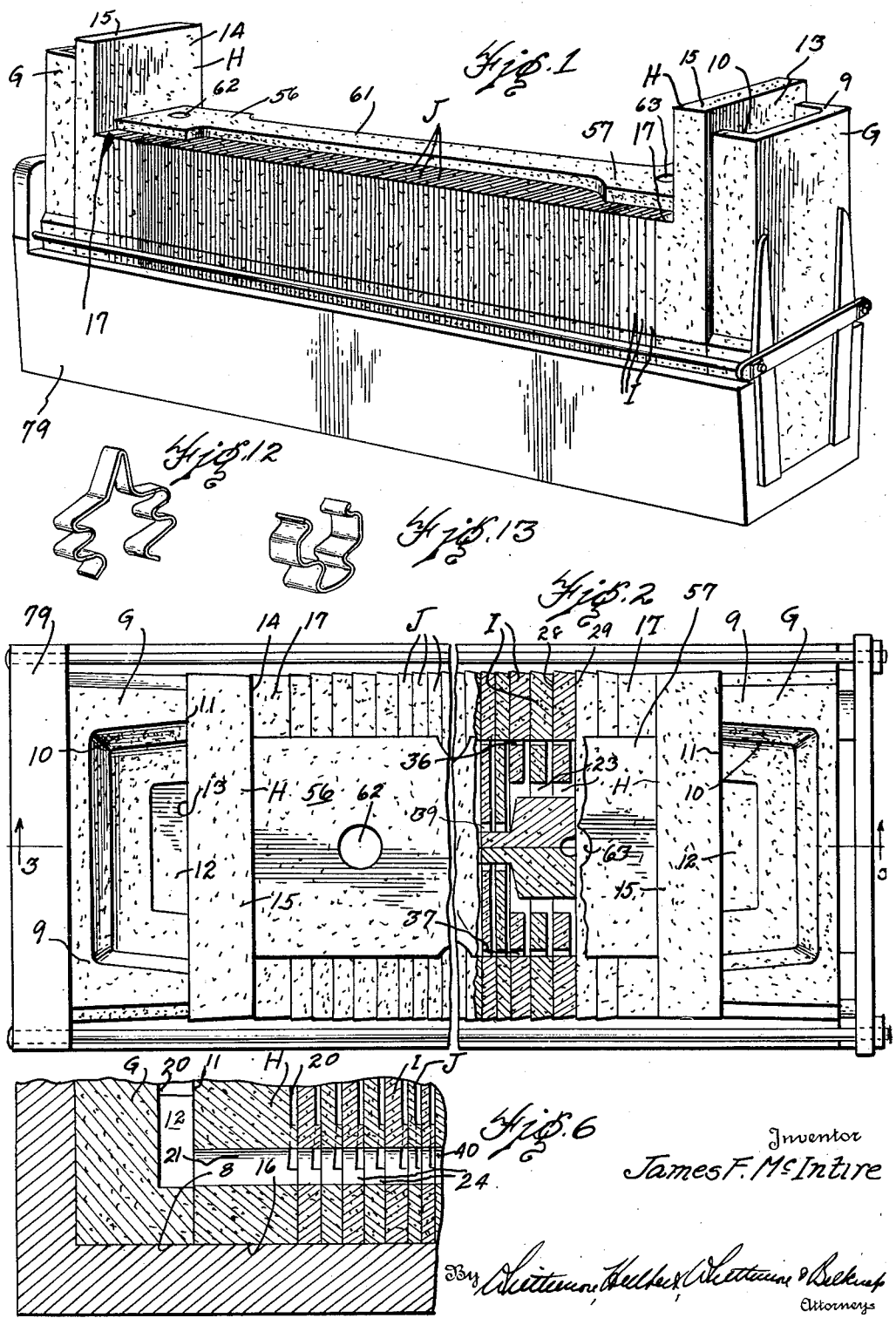
Aug. 21, 1934.  J. F. McINTIRE  1,970,760
APPARATUS FOR MAKING RADIATORS
Filed Aug. 15, 1932  5 Sheets-Sheet 1
Inventor
James F. McIntire

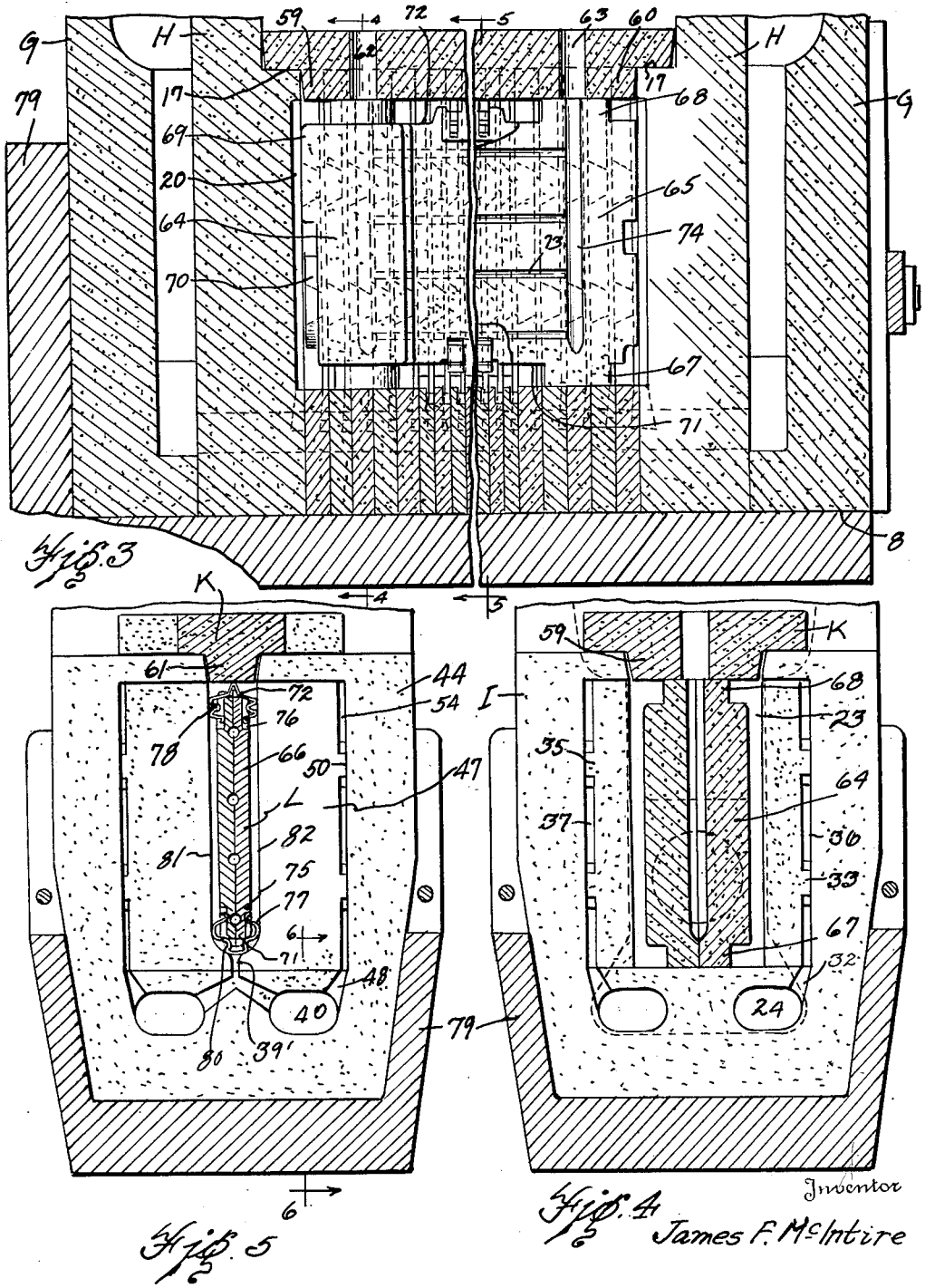

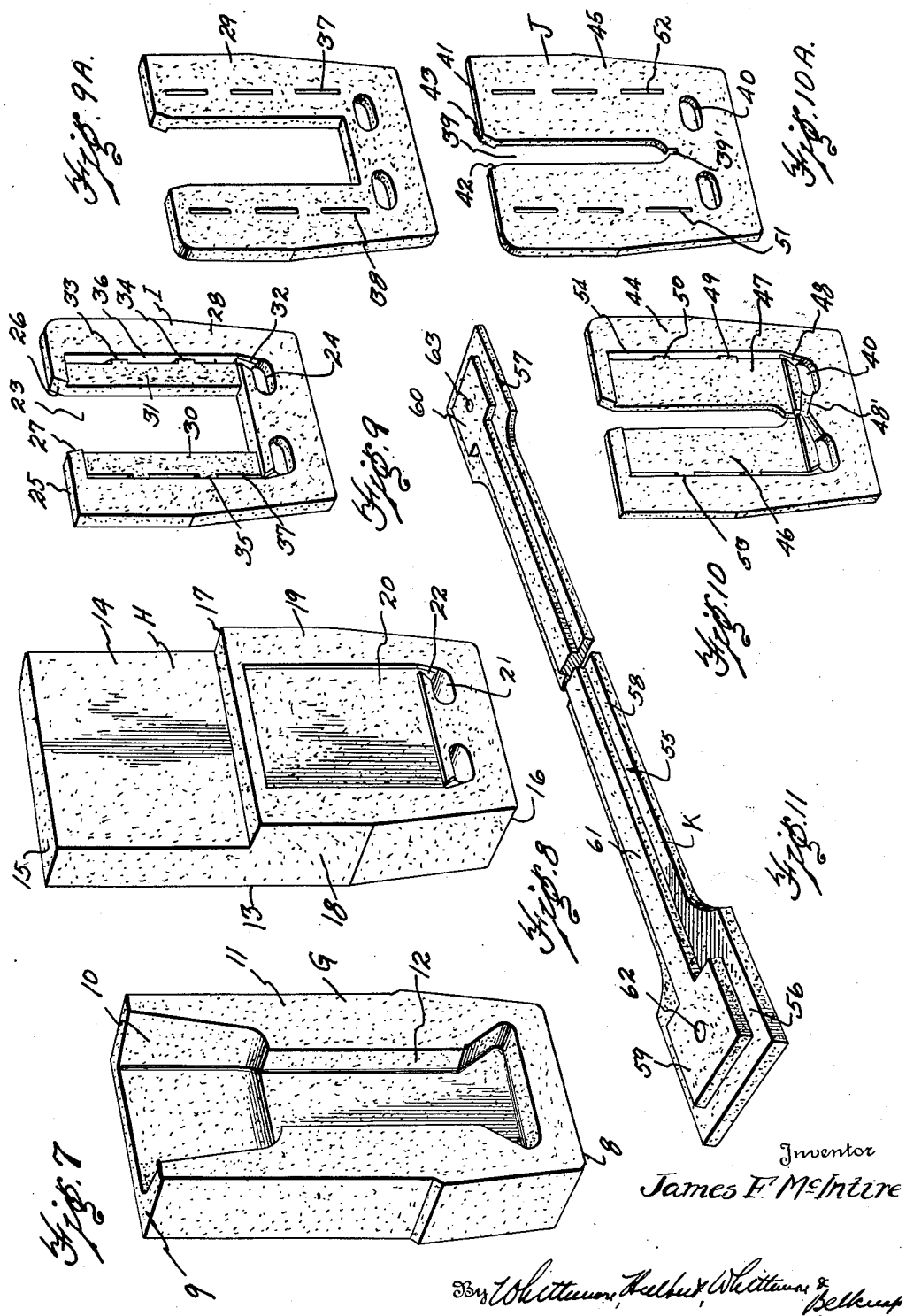

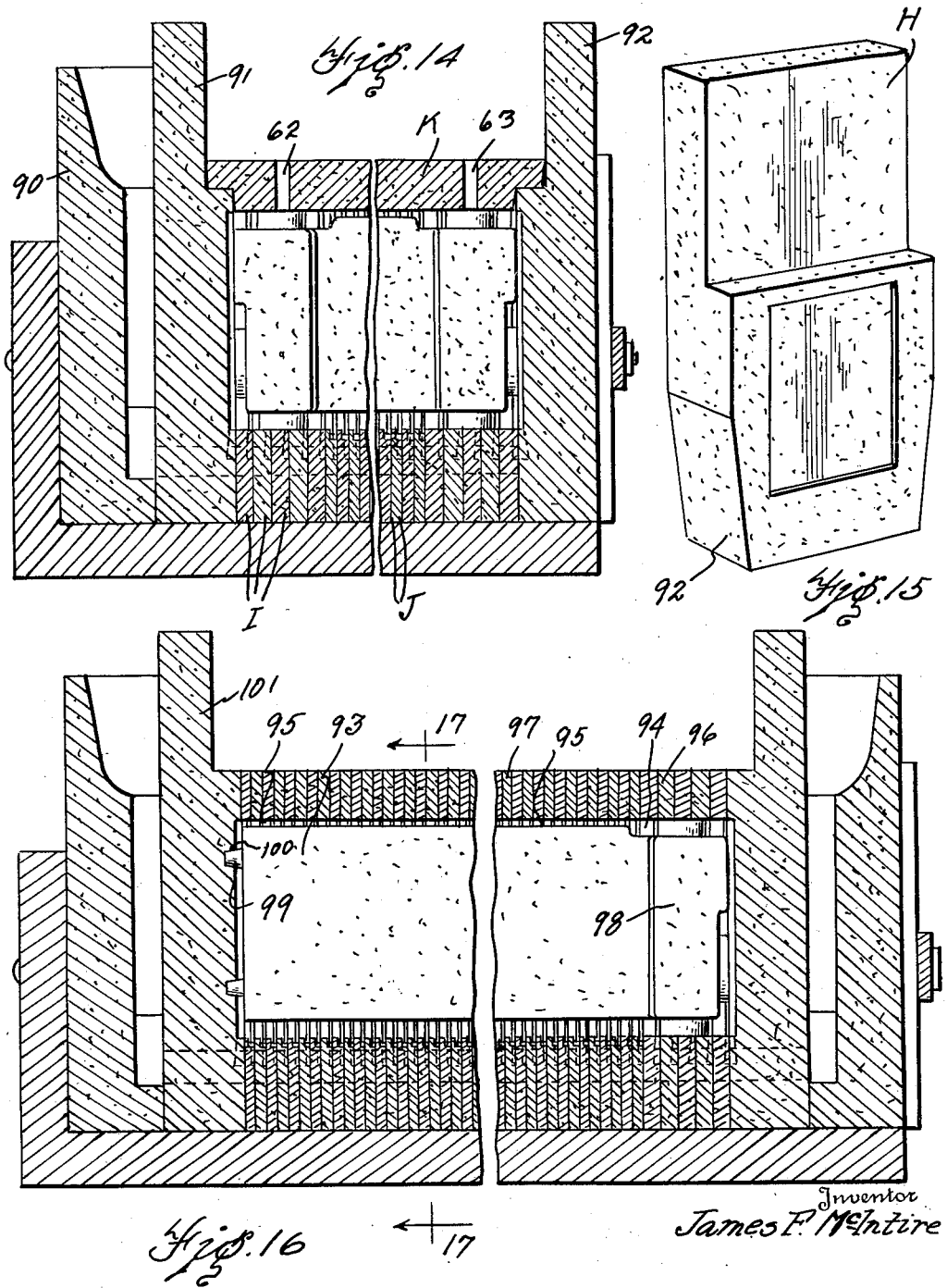

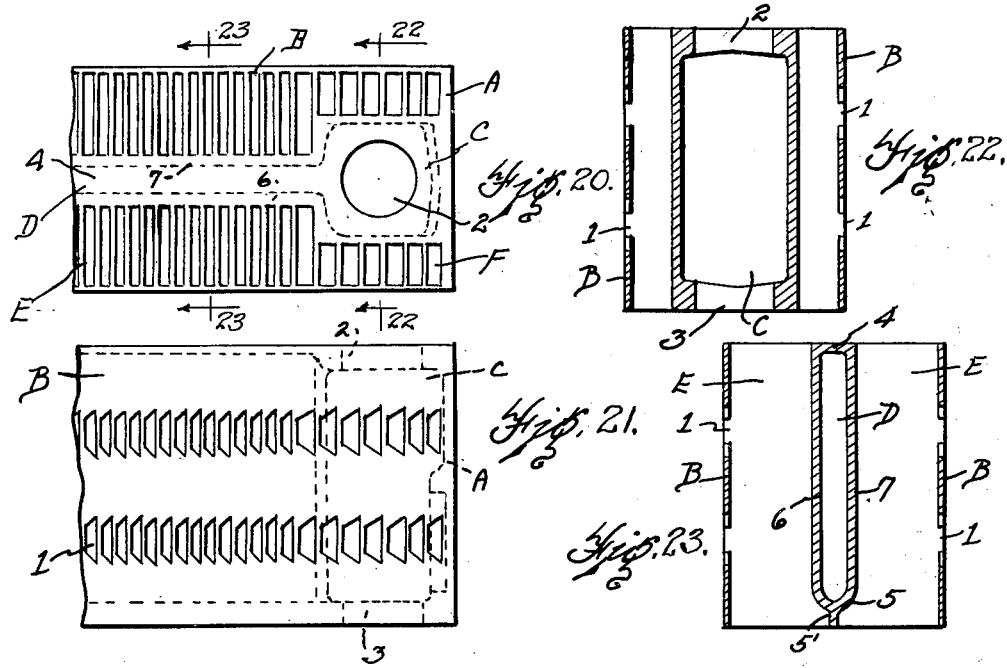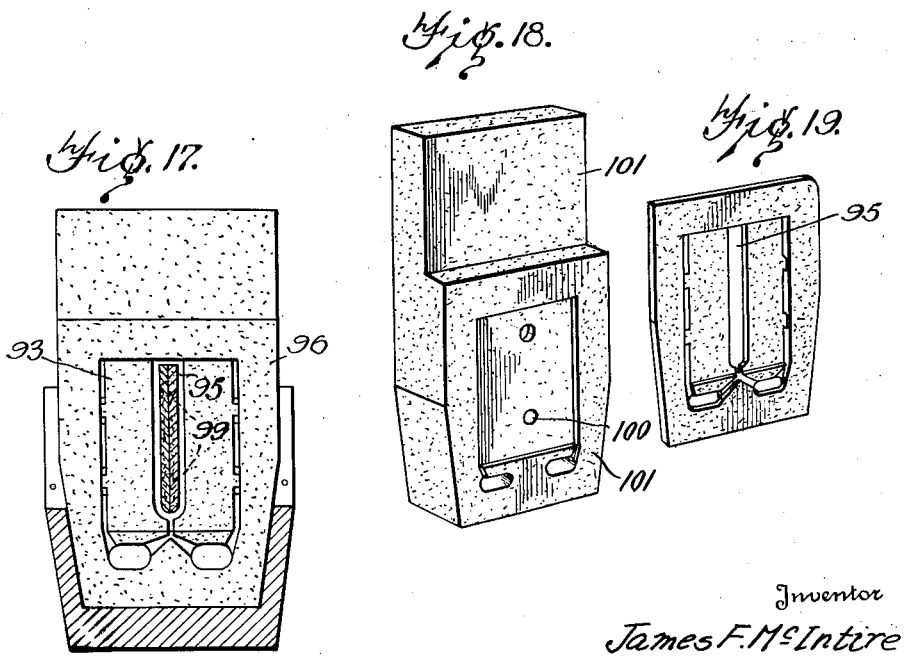

1,970,760

UNITED STATES PATENT OFFICE 1,970,760

APPARATUS FOR MAKING RADIATORS

James F. McIntire, Detroit, Mich., assignor to United States Radiator Corporation, Detroit, Mich., a corporation of New York Application August 15, 1932, Serial No. 628,950

9 Claims. (Cl. 22—131)

This invention relates generally to the manufacture of radiators and consists of certain novel features of construction, combinations and arrangements of parts, that will be hereinafter more fully described and particularly pointed out in the appended claims.

In the accompanying drawings:

Figure 1 is a perspective view of the apparatus employed for making the radiator;

Figure 2 is a top plan view of the structure illustrated in Figure 1, with parts broken away and in section;

Figure 3 is a vertical longitudinal sectional view taken on the line 3—3 of Figure 2;

Figure 4 is a vertical transverse section taken on the line 4—4 of Figure 3;

Figure 5 is a vertical transverse section taken on the line 5—5 of Figure 3;

Figure 6 is a vertical longitudinal section taken on the line 6—6 of Figure 5;

Figure 7 is a perspective view of one of the sprue cores;

Figure 8 is a perspective view of one of the end cores;

Figures 9 and 9A are perspective views of opposite sides of one of the header cores;

Figures 10 and 10A are perspective views of opposite sides of one of the fin cores;

Figure 11 is a perspective view of the cover core;

Figure 12 is a perspective view of one of the upper chaplets;

Figure 13 is a perspective view of one of the lower chaplets;

Figure 14 is a vertical longitudinal sectional view through a slight modification wherein a different form of header core has been substituted at one end for the sprue and header cores illustrated in Figure 3;

Figure 15 is a perspective view of the substituted header core illustrated in Figure 14;

Figure 16 is a vertical longitudinal sectional view through another modification wherein the fluidway core is inserted longitudinally within the fin and header cores;

Figure 17 is a vertical transverse sectional view taken on the line 17—17 of Figure 16;

Figure 18 is a perspective view of one of the header cores illustrated in Figure 16;

Figure 19 is a perspective view of one of the fin cores illustrated in Figure 16;

Figure 20 is a fragmentary top plan view of a radiator of the single water-way type that is adapted to be formed in the apparatus illustrated in Figures 1 to 11 inclusive and 14 to 19 inclusive;

Figure 21 is a side elevation of the radiator illustrated in Figure 20;

Figure 22 is a sectional view taken on the line 22—22 of Figure 20;

Figure 23 is a sectional view taken on the line 23—23 of Figure 20.

Referring now to the drawings, A are the end walls; B are the side walls; C are the headers; D is the fluidway; and E and F respectively are the fins of a radiator made in accordance with my invention. As shown, the parts are integrally united and form a radiator that has a uniform cross sectional area throughout its length. Preferably the end walls A are flat and are relatively thick. The side walls B are thinner than the end walls and are terminally secured thereto at the outer upright edges thereof. Preferably such side walls B are provided at spaced points thereof with openings 1. The headers C are substantially rectangular in shape and are vertically disposed upon the inner sides of the end walls A in spaced relation to the side walls B. Preferably openings 2 and 3 respectively are provided in the headers C for the reception of suitable piping (not shown). The fluidway D extends between the headers C and is disposed substantially midway between and in substantially parallel relation to the side walls B. The top wall 4 of said fluidway is flat while the bottom wall 5 thereof is substantially Y-shape in cross section. The side walls 6 and 7 respectively of the fluidway are parallel to each other and to the side walls B. The fins E are located between the headers C and project laterally from the sides 6 and 7 of the fluidway to the side walls B, while the fins F are located upon and project laterally from opposite sides of the headers C to the side walls B. Preferably the fins E and F are relatively thin and are closely spaced in parallel relation to the end walls A. In this connection it will be noted that the fins are upon opposite sides of the openings 1 and that the latter are arranged in vertically spaced rows extending longitudinally of the radiator. It will also be noted that the upper edges of the end walls A, side walls B, fins E and F, upper wall 4 of the fluidway and the upper ends of the headers C are substantially flush and that the lower edges, walls and ends of said parts are also substantially flush. Thus a very compact and uniform construction is provided.

Preferably sprue, end, header, fin, cover and fluidway dry sand cores G, H, I, J, K and L respectively are employed in the process of manufacturing the radiator just described. As shown in Figures 1 to 7 inclusive, there are two sprue cores G and each preferably comprises a relatively thick upright body or slab having flat ends 8 and 9 respectively. For receiving the molten metal I have provided in the upper end 9 of each body an upwardly flaring sprue 10 that opens through the inner side 11, and have provided an inverted substantially T-shaped gate 12 that extends downwardly from the lower end of the sprue 10 and also opens through the inner side 11. There are also two end cores H and each preferably comprises a relatively thick upright body or slab having flat outer and stepped inner walls 13 and 14 respectively and flat upper and lower ends 15 and 16 respectively. Preferably the end cores H are higher than the sprue cores G and when assembled project above the upper ends 9 of said sprue cores. The flat outer sides 13 of the end cores are engageable with the flat inner sides 11 of the sprue cores and when assembled form the inner sides of the sprues 10 and gates 12. The steps 17 are flat and constitute the upper edges of plate-like portions 18 of the slabs H. Preferably each of these portions 18 has a flat face 19 in which substantially square recesses 20, a pair of laterally spaced openings 21 and runners 22 are provided for receiving the molten metal. As shown, the recesses 20 correspond in shape to the end walls A of the radiator; the openings 21 extend through the bodies H so as to receive the molten metal from the gates 12; and the runners 22 incline upwardly from the upper walls of said openings to the lower corners of the recesses 20. Thus the molten metal from the gates 12 will flow upwardly from the openings 21 into the recesses 20 to form the end walls A of the radiator. The header cores I are arranged in two series, one upon the inner side of each end core H. As shown, each of the header cores I comprises a plate that substantially corresponds in area to the plate-like portions 18 of the end cores. Preferably each core I has a vertical substantially rectangular shaped opening 23 and is provided below said opening with a pair of laterally spaced openings 24 corresponding to and adapted to register with the openings 21 in the end cores. As shown, the openings 23 extend through the upper edges 25 of the cores I and are provided at their upper ends with flaring edge portions 26 and 27 respectively. The faces 28 and 29 respectively of each core I are flat. However, each face 28 is preferably provided upon opposite sides of the opening 23 with recesses 30 and 31 respectively corresponding in area to the fins F and is provided with runners 32 that extend upwardly from the upper walls of the openings 24 to the lower corners of the recesses 30 and 31. Webs 33 and 34 corresponding in area to the openings 1 are provided at spaced points of the upright edges 35 and 36 respectively of the recesses 30 and 31, and slots 37 and 38 respectively corresponding in area to the cross section of the side walls B are provided along said edges 35 and 36 above and below the webs 33 and 34. The fin cores J are arranged in series between the two series aforesaid of header cores I, and each preferably comprises a plate that corresponds in area to the header cores I. As shown, each core plate J has a vertical elongated opening 39 and is provided below said opening with a pair of laterally spaced openings 40 corresponding to and adapted to register with the openings 24 in the header cores. The openings 39 extend through the upper edges 41 of the cores J and are provided at their upper ends with flaring edge portions 42 and 43 respectively. The faces 44 and 45 respectively of each core plate J are flat, however, each face 44 is preferably provided upon opposite sides of the opening 39 with recesses 46 and 47 respectively corresponding in area to the fins E and is provided with runners 48 that extend upwardly from the upper walls of the openings 40 to the lower corners of the recesses 46 and 47. Runners 48' incline upwardly from the inner ends of the openings 40 for supplying molten metal to vertical slots 39' provided in the lower ends of the openings 39. Webs 49 and 50 corresponding to the webs 33 and 34, and slots 51 and 52 respectively corresponding to the slots 37 and 38 are provided along the upright edges 53 and 54 respectively of the recesses 46 and 47. The cover core K is in the form of an elongated slab and extends between the end cores H. Preferably this cover core K has a flat body 55 that rests upon the steps 17 of the end cores and upon the upper edges 25 and 41 respectively of the header and fin cores. Opposite ends 56 and 57 of the body 55 are substantially square shape and are adapted to cover the openings 23 in the header cores when the parts are assembled, while the intermediate portion 58 of said body 55 is relatively narrow and is adapted to cover the openings 39 in the fin cores J when the parts are assembled. Projecting downwardly from the end portions 56 and 57 of said core J are substantially square shaped portions 59 and 60 respectively that are adapted to fit within the openings 23 in the header cores, while projecting downwardly from the narrow portion 58 is a rib 61 that is adapted to fit within the openings 39. To permit the escape of core gases suitable openings 62 and 63 respectively are provided in the cover core K at opposite ends thereof. The fluidway core L extends between the end cores H and preferably has a pair of header portions 64 and 65 respectively and an intermediate web portion 66. As shown, the header portions 64 and 65 are substantially rectangular in shape and have substantially cylindrical prints 67 and 68 respectively projecting vertically from the upper and lower ends thereof. These header portions 64 and 65 are also provided upon their outer sides with vertically spaced substantially square and substantially cylindrical portions 69 and 70 respectively. The web 66 is relatively thin and merges into the inner sides of the header portions 64 and 65 at the centers thereof. The lower edge 71 of the web 66 is rounded or substantially U-shape in cross section and is in line with the lower ends of the header portions 64 and 65, while the upper edge 72 of the web is substantially flat and is located above the upper ends of the header portions. Suitable horizontal and vertical passages 73 and 74 respectively are provided in the core L to permit the escape of core gases. As shown in Figure 3, vertical passages 74 are at opposite ends of the passages 73 and are preferably in vertical alignment with the vents 62 and 63 respectively in the cover core K. Adjacent the header portions 64 and 65 the web 66 is provided at the upper and lower edges thereof with recesses 75 and 76 respectively which are adapted to receive the spring arms of suitable chaplets 77 and 78.

In use, the cores G, H, I and J are assembled and clamped in a suitable rack such as 79 (see Figure 1). The fluidway core L is then placed in the openings 23 and 39 respectively in the header and fin cores (see Figures 3, 4 and 5 respectively), and finally the cover core K is placed upon the steps 17 of the end cores and upon the upper edges 25 and 41 respectively of the header and fin cores. (See Figures 1, 3, 4 and 5.) In this connection it will be noted that the lower end 80 and opposite sides 81 and 82 respectively of certain of the openings 39 are engaged by the chaplet 77, while the opposite sides 81 and 82, certain of the openings 39, and the lower face of the rib 61 are engaged by the chaplet 78. Thus the fluidway core L is effectively held in position for the pouring of the molten metal. After the parts have been assembled as described the molten metal may be poured into either or both of the sprues 10 and will flow through the gates 12, openings 21, 24 and 40 upwardly through the runners 22, 32, 48 and 48' to the recesses 20, 30, 31, 46 and 47 into the slots 39' to form the stems 5' of the fluidway walls 5, through the slots 37, 38, 51 and 52 and about the fluidway core L in the openings 23 and 39 to form the radiator. Thus it will be apparent that the end walls A will be formed in the recesses 20 in the end cores H, the side walls B will be formed in the slots 37, 38, 51 and 52 in the header and fin cores I and J, the headers C and fluidway G will be formed in the openings 23 and 39 respectively in the header and fin cores, and the fins E and F will be formed in the recesses 30, 31, 46 and 47 respectively in the header and fin cores. The cover core K cooperates with the end, header and fin cores H, I and J respectively to form the upper ends of the headers C and the upper wall 4 of the fluidway.

In Figures 14 and 15 I have illustrated a slight modification wherein only one sprue core 90 is employed for receiving the molten metal. Two end cores 91 and 92 are used, however, only the one designated 91 corresponds to the end core H illustrated in Figure 8. The other end core designated 92 and illustrated in Figure 15 is similar to the one illustrated in Figure 8 except that it is without openings such as 21 and runners such as 22. The remainder of the structure is the same as that illustrated in Figures 1 to 13 inclusive, consequently this apparatus will produce a radiator corresponding to that illustrated in Figures 31 to 34 inclusive.

In Figures 16 to 19 inclusive I have illustrated another modification wherein the fluidway core 93 is moved longitudinally from the right to the left in openings 94 and 95 respectively in the header and fin cores 96 and 97 respectively. Preferably this fluidway core 93 has only one header portion 98 and is provided at its other end with vertically spaced prints 99 of substantially cylindrical formation that are adapted when the core is moved longitudinally in the fin and header cores to engage corresponding sockets 100 in the end core 101. Except for these sockets the end core 101 is similar to the end core illustrated in Figure 8. Referring to Figures 16, 17 and 19 it will be noted that the upper ends of the openings 94 and 95 in the cores 96 and 97 are closed. Otherwise the structure is the same as that illustrated in Figures 1 to 13 inclusive and will produce a radiator similar to that illustrated in Figures 20 to 23 inclusive.

Thus from the foregoing it will be apparent that I have provided an extremely simple and inexpensive method of and apparatus for manufacturing radiators. It is decidedly less involved than the usual molding process wherein flasks and green sand are employed and may be performed entirely in the core room. In fact, my method avoids the usual molding operations and eliminates entirely the use of metal flasks, the necessity of making green sand molds, the contact of molten metal with improperly conditioned green sand, and the consequent sand tempering and loss of green sand.

While it is believed that from the foregoing description the nature and advantages of the invention will be readily apparent, I desire to have it understood that I do not limit myself to what is herein shown and described and that such changes may be resorted to when desired as fall within the scope of what is claimed.

What I claim as my invention is:

1. A mold for forming a radiator having end and side walls, headers upon the end walls, a fluidway extending between said headers, fins projecting laterally from opposite sides of the fluidway to said side walls, and fins projecting laterally from the headers to said side walls, comprising a longitudinally extending dry sand core having a relatively thin elongated body for forming the fluidway and having enlargements at opposite ends thereof for forming the headers, and a casing for said core comprising slabs at opposite ends of said core in spaced relation to the enlargements, vertically disposed fin cores arranged one against the other in a row between said enlargements and having substantially horizontal and vertical portions respectively spaced beneath and upon opposite sides of said elongated body, vertically disposed header cores arranged one against the other in rows between the slabs and the adjacent fin cores aforesaid and having substantially horizontal and vertical portions respectively spaced beneath and upon opposite sides of said enlargements, and a cover core extending over the vertical portions of said fin and header cores between said slabs, the slabs being provided in their inner faces with recesses into which metal may flow to form the end walls aforesaid, one of said slabs being provided below the recess therein with an opening for receiving molten metal and having a runner for conducting said metal upwardly to said recess, the fin cores being provided in horizontal alignment with the recesses aforesaid with recesses into which metal may flow to form the first mentioned fins, the header cores being provided in horizontal alignment with the recesses aforesaid with recesses into which metal may flow to form the last mentioned fins, the bases of the recesses in the fin and header cores being provided at their outer upright edges with aligned slots into which metal may flow to form the side walls of the radiator, the fin and header cores being provided beneath the recesses therein with openings that are in alignment with and adapted to receive metal from the opening in the slab and having runners for conducting such metal upwardly from said openings to the recesses therein.

2. A mold for forming a radiator having end and side walls, headers upon the end walls, a fluidway extending between said headers, and fins projecting laterally from opposite sides of the fluidway to said side walls, comprising a longitudinally extending dry sand core having a relatively thin elongated body for forming the fluidway and having enlargements at opposite ends thereof for forming the headers, and a casing for said core comprising slabs at opposite ends of said core in spaced relation to the enlargements, vertically disposed fin cores arranged one against the other in a row between said enlargements and having substantially horizontal and vertical portions respectively spaced beneath and upon opposite sides of said elongated body, vertically disposed header cores arranged one against the other in rows between the slabs and the adjacent fin cores aforesaid and having substantially horizontal and vertical portions respectively spaced beneath and upon opposite sides of said enlargements, and a cover core extending over the vertical portions of said fin and header cores between said slabs, the slabs being provided in their inner faces with recesses into which metal may flow to form the end walls aforesaid, one of said slabs being provided below the recess therein with an opening for receiving molten metal and having a runner for conducting such metal upwardly to the recess therein, the fin cores being provided in horizontal alignment with the recesses aforesaid with recesses into which metal may flow to form the fins of the radiator, the bases of the recesses in the fin cores and the header cores being provided with aligned slots into which metal may flow to form the side walls of the radiator, the fin cores and header cores having openings in alignment with and adapted to receive molten metal from the opening in the slab and having runners for conducting such metal upwardly from said openings to the spaces between the vertical portions thereof.

3. A mold for forming a radiator having end and side walls, headers upon the end walls, a fluidway extending between said headers, fins projecting laterally from opposite sides of the fluidway to said side walls, and fins projecting laterally from the headers to said side walls, comprising a longitudinally extending dry sand core having a relatively thin elongated body for forming the fluidway and having enlargements at opposite ends thereof for forming the headers, and a casing for said core comprising slabs at opposite ends of said core in spaced relation to the enlargements, vertically disposed fin cores arranged one against the other in a row between said enlargements and having substantially horizontal and vertical portions respectively spaced beneath and upon opposite sides of said elongated body, vertically disposed header cores arranged one against the other in rows between the slabs and the adjacent fin cores aforesaid and having substantially horizontal and vertical portions respectively spaced beneath and upon opposite sides of said enlargements, and a cover core extending over the vertical portions of said fin and header cores between said slabs, the said slabs being provided in their inner faces with recesses into which metal may flow to form the end walls aforesaid, one of said slabs being provided below the recess therein with an opening for receiving molten metal and having a runner for conducting such metal upwardly to said recess, means cooperating with the last mentioned slab having the opening therein to form a gate through which molten metal may flow to said opening, the fin cores being provided in horizontal alignment with the recesses aforesaid with recesses into which metal may flow to form the first mentioned fins, the header cores being provided in horizontal alignment with the recesses aforesaid with recesses into which metal may flow to form the last mentioned fins, the bases of the recesses in the fin and header cores being provided with aligned slots into which metal may flow to form the side walls of the radiator, the fin and header cores being provided beneath the recesses therein with openings that are in alignment with and adapted to receive molten metal from the opening in the slab aforesaid and having runners for conducting such metal upwardly from said openings to the recesses therein.

4. A mold for forming a radiator having end and side walls, headers upon the end walls, a fluidway extending between said headers, and fins projecting laterally from opposite sides of the fluidway to said side walls, comprising a longitudinally extending dry sand core having a relatively thin elongated body for forming the fluidway and having enlargements at opposite ends thereof for forming the headers, and a casing for said core comprising slabs at opposite ends of said core in spaced relation to the enlargements, vertically disposed fin cores arranged one against the other in a row between said enlargements and having substantially horizontal and vertical portions respectively spaced beneath and upon opposite sides of said elongated body, vertically disposed slab-like cores arranged one against the other in rows between the slabs and the adjacent fin cores and having substantially horizontal and vertical portions respectively spaced beneath and upon opposite sides of said enlargements, and a cover core extending over the vertical portions of said fin and slab-like cores between said slabs, the said slabs being provided in their inner faces with recesses into which metal may flow to form the end walls aforesaid, one of said slabs being provided below the recess therein with an opening for receiving molten metal and having a runner for conducting such metal upwardly to said recess, means cooperating with the last mentioned slab having the opening therein to form a gate through which molten metal may flow to said opening, the fin cores being provided in horizontal alignment with the recesses in the end cores with recesses into which metal may flow to form the fins of the radiator, the bases of the recesses in the fin cores and the slab-like cores being provided substantially in alignment with the outer upright edges of the recesses in said fin cores with aligned slots into which metal may flow to form the side walls of the radiator, the fin and slab-like cores having openings in alignment with and adapted to receive molten metal from the opening in the slab aforesaid and having runners for conducting such metal upwardly from said openings to the space between the vertical portions thereof.

5. A mold for forming a radiator having end and side walls, headers upon the end walls, a fluidway extending between said headers, fins projecting laterally from opposite sides of the fluidway to said side walls, and fins projecting laterally from the headers to said side walls, comprising a longitudinally extending dry sand core having a relatively thin elongated body for forming the fluidway, means at opposite ends of said fluidway for forming the headers, and a casing for said core and means comprising slabs at opposite ends of said core in spaced relation to said means, vertically disposed fin cores arranged one against the other in a row between said means and having substantially horizontal and vertical portions respectively spaced beneath and upon opposite sides of said elongated body, vertically disposed header cores arranged one against the other in rows between the slabs and the adjacent fin cores aforesaid and having substantially horizontal and vertical portions respectively spaced beneath and upon opposite sides of the means aforesaid, and a cover core extending over the vertical portions of said fin and header cores between said slabs, the slabs being provided in their inner faces with recesses into which metal may flow to form the end walls aforesaid, one of said slabs being provided below the recess therein with an opening for receiving molten metal and having a runner for conducting said metal upwardly to said recess, the fin cores being provided in horizontal alignment with the recesses aforesaid with recesses into which metal may flow to form the first mentioned fins, the header cores being provided in horizontal alignment with the recesses aforesaid with recesses into which metal may flow to form the last mentioned fins, the fin and header cores being provided with aligned slots into which metal may flow to form the side walls of the radiator, the fin and header cores being provided beneath the recesses therein with openings that are in alignment with and are adapted to receive metal from the opening in the slab and having runners for conducting such metal upwardly from said openings to the recesses therein.

6. A mold for forming a radiator having end and side walls, headers upon the end walls, a fluidway extending between said headers, and fins projecting laterally from opposite sides of the fluidway to said side walls, comprising a longitudinally extending dry sand core having a relatively thin elongated body for forming the fluidway, means at opposite ends of said fluidway for forming the headers, and a casing for said core and means comprising slabs at opposite ends of said core in spaced relation to said means, vertically disposed fin cores arranged one against the other in a row between said means and having substantially horizontal and vertical portions respectively spaced beneath and upon opposite sides of said elongated body, vertically disposed header cores arranged one against the other in rows between the slabs and the adjacent fin cores aforesaid and having substantially horizontal and vertical portions respectively spaced beneath and upon opposite sides of the means aforesaid, and a cover core extending over the vertical portions of said fin and header cores between said slabs, the slabs being provided in their inner faces with recesses into which metal may flow to form the end walls aforesaid, one of said slabs being provided below the recess therein with an opening for receiving molten metal and having a runner for conducting such metal upwardly to the recess therein, the fin cores being provided in horizontal alignment with the recesses aforesaid with recesses into which metal may flow to form the fins of the radiator, the fin cores and the header cores being provided with aligned slots into which metal may flow to form the side walls of the radiator, the fin cores and header cores also having openings in alignment with and adapted to receive molten metal from the opening in the slab and having runners for conducting such metal upwardly from said openings to the spaces between the vertical portions thereof.

7. A mold for forming a radiator having end walls, headers upon the end walls, a fluidway extending between said headers, and fins projecting laterally from opposite sides of the fluidway, comprising a longitudinally extending dry sand core having a relatively thin elongated body for forming the fluidway, means at opposite ends of said fluidway for forming the headers, and a casing for said core and means comprising slabs at opposite ends of said core in spaced relation to said means, vertically disposed fin cores arranged one against the other in a row between said means and having substantially horizontal and vertical portions respectively spaced beneath and upon opposite sides of said elongated body, vertically disposed header cores arranged one against the other in rows between the slabs and the adjacent fin cores aforesaid and having substantially horizontal and vertical portions respectively spaced beneath and upon opposite sides of the means aforesaid, and a cover core extending over the vertical portions of the fin and header cores between said slabs, the slabs being provided in their inner faces with recesses into which metal may flow to form the end walls aforesaid, one of said slabs being provided below the recess therein with an opening for receiving molten metal and having a runner for conducting such metal upwardly to the recess therein, the fin cores being provided in horizontal alignment with the recesses aforesaid with recesses into which metal may flow to form the fins of the radiator, the fin cores and header cores also having openings in alignment with and adapted to receive molten metal from the opening in the slab and having runners for conducting such metal upwardly from said openings to the spaces between the vertical portions thereof.

8. A mold for forming a radiator having side walls, headers at opposite ends of said side walls, a fluidway extending between said headers, and fins projecting laterally from opposite sides of the fluidway to said side walls, comprising a longitudinally extending dry sand core having a relatively thin elongated body for forming the fluidway, means at opposite ends of said fluidway for forming the headers, vertically disposed header cores arranged one against the other in rows at opposite ends of said longitudinally extending dry sand core and having substantially horizontal and vertical portions respectively spaced beneath and upon opposite sides of the means aforesaid, vertically disposed fin cores arranged one against the other in a row between said header cores and having substantially horizontal and vertical portions respectively spaced beneath and upon opposite sides of said elongated body, and a cover core extending over the vertical portions of said fin and header cores, the fin cores being provided with horizontally aligned vertically extending recesses into which metal may flow to form the fins of the radiator, said fin cores and header cores being provided with horizontally aligned vertically extending slots into which metal may flow to form the side walls of the radiator, and said fin cores and header cores also having horizontally aligned openings beneath said recesses adapted to receive molten metal and having runners for conducting such metal upwardly from said openings to said recesses.

9. A mold for forming a radiator having end and side walls, headers upon the end walls, and a fluidway extending between said headers, comprising a longitudinally extending dry sand core having a relatively thin elongated body for forming the fluidway, means at opposite ends of said fluidway for forming the headers, and a casing for said core and means comprising slabs at opposite ends of said core in spaced relation to said means, vertically disposed slab-like cores arranged one against the other in a row between said means and having substantially horizontal and vertical portions respectively spaced beneath and upon opposite sides of said elongated body, vertically disposed slab-like cores arranged one against the other in rows between the slabs and the adjacent slab-like cores aforesaid and having substantially horizontal and vertical portions respectively spaced beneath and upon opposite sides of the means aforesaid, and a cover core extending over the vertical portions of said slab-like cores between said slabs, the slabs being provided in their inner faces with recesses into which metal may flow to form the end walls aforesaid, one of said slabs being provided below the recess therein with an opening for receiving molten metal and having a runner for conducting such metal upwardly to the recess therein, the slab-like cores being provided with aligned slots into which metal may flow to form the side walls of the radiator and having openings in alignment with and adapted to receive molten metal from the opening in the slab, said slab-like cores also having runners for conducting the molten metal upwardly from said openings to the spaces between the vertical portions thereof.

JAMES F. McINTIRE.